Aug. 15, 1950  J. SANDIN ET AL  2,519,291
DELAYED ELECTROMAGNETIC TRIP CIRCUIT BREAKER
Filed May 17, 1947  2 Sheets-Sheet 1
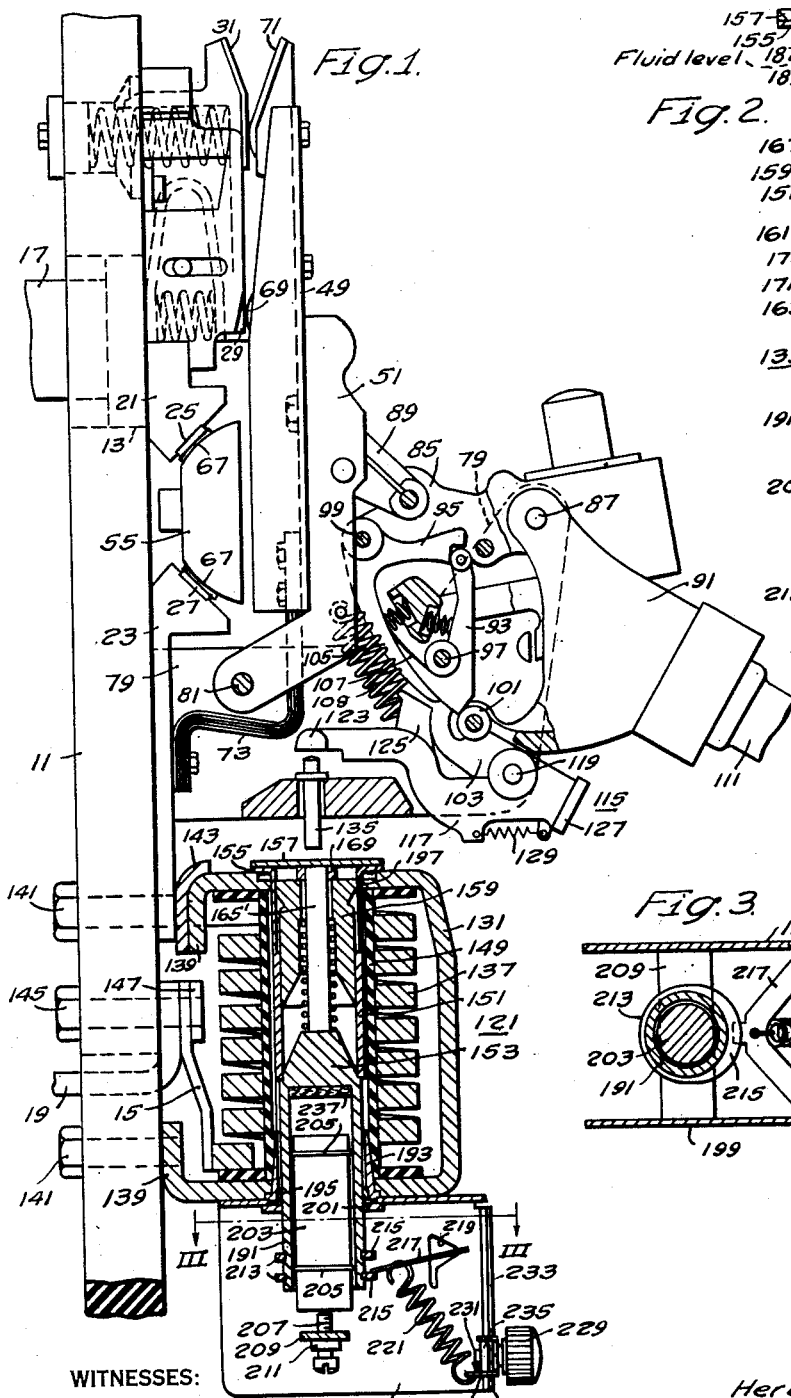
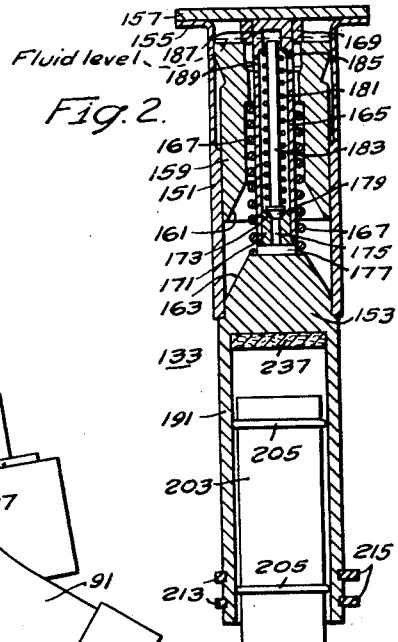
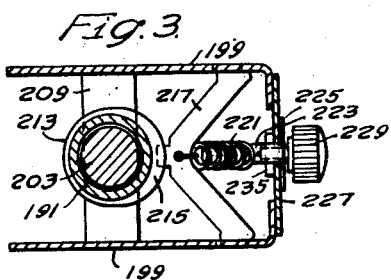
WITNESSES:
INVENTORS
Herbert L. Rawlins
and Jerome Sandin.
BY
ATTORNEY Aug. 15, 1950  J. SANDIN ET AL  2,519,291
DELAYED ELECTROMAGNETIC TRIP CIRCUIT BREAKER
Filed May 17, 1947  2 Sheets—Sheet 2
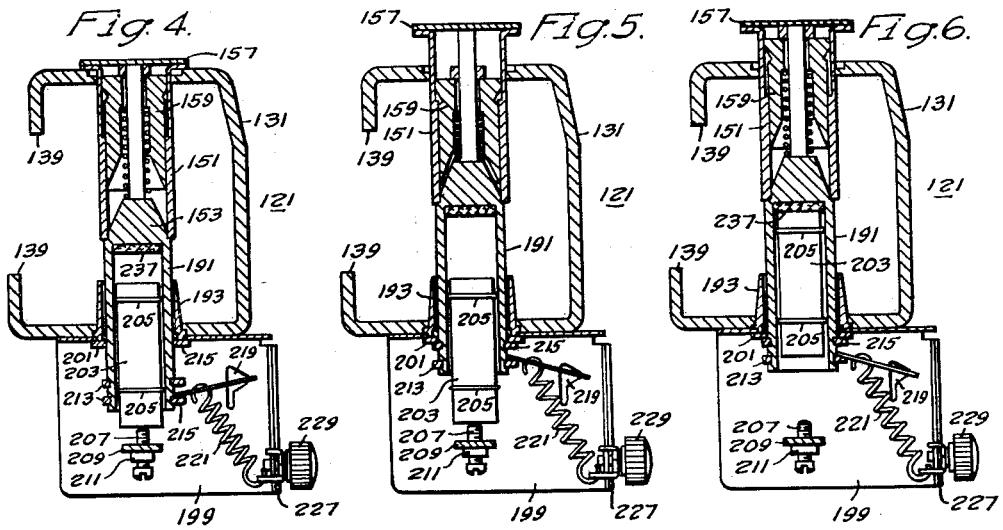
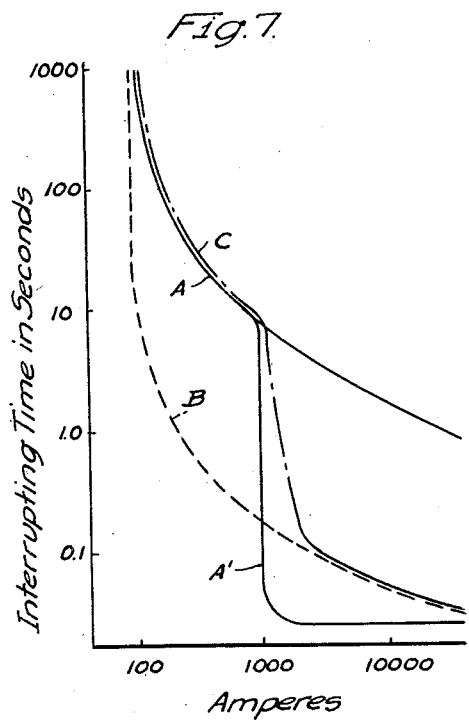
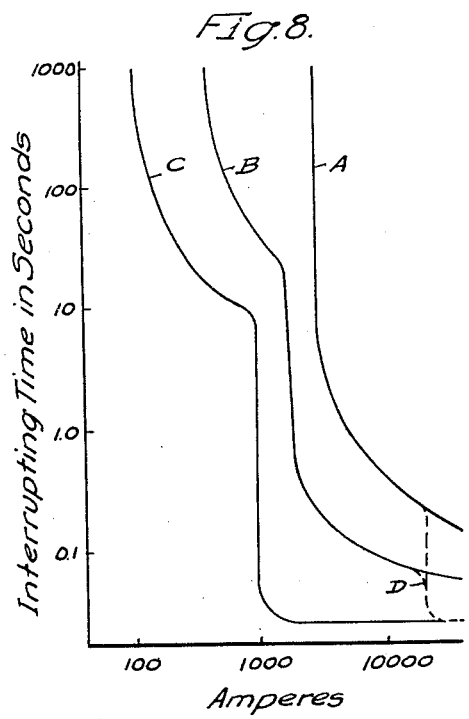
WITNESSES:
E.A. M'Closkey.
Paul O. Harlin.
INVENTORS
Herbert L. Rawlins
and Jerome Sandin.
BY F.W. Lyle.
ATTORNEY Patented Aug. 15, 1950　　　　　　　　　　　　　　　2,519,291

UNITED STATES PATENT OFFICE 2,519,291

DELAYED ELECTROMAGNETIC TRIP CIRCUIT BREAKER

Jerome Sandin, Forest Hills, and Herbert L. Rawlins, Edgewood, Pa., assignors to Westinghouse Electric Corporation, East Pittsburgh, Pa., a corporation of Pennsylvania Application May 17, 1947, Serial No. 748,808

11 Claims. (Cl. 200—109)

This invention relates to circuit breakers and more particularly, to trip devices for controlling the automatic operation of circuit breakers.

An object of the invention is to provide a circuit breaker embodying an improved trip device which is of simple construction, reliable in operation and inexpensive to manufacture.

Another object of this invention is to provide a circuit breaker with an improved electromagnetic trip device operable to trip the breaker after a relatively long time delay in response to overload currents of relatively low value, after a relatively short time delay in response to overload currents of intermediate value up to a predetermined value and instantaneously in response to overload currents above said predetermined value.

Another object of the invention is to provide a circuit breaker embodying an improved trip device wherein a time delay device disposed within a sealed casing functions to trip the breaker after a long time delay on certain overload current conditions and also after a relatively short time delay on certain other overload current conditions.

Another object of the invention is to provide a circuit breaker embodying an improved trip device having a time delay device disposed in a sealed casing which is movable to trip the breaker, the time delay device within said casing delaying tripping of the breaker for a relatively long time on low overload currents and delaying tripping of the breaker for a relatively short time on overloads of intermediate value.

Another object of the invention is to provide a circuit breaker embodying an improved trip device (1) having sufficient time delay throughout the range of motor starting currents to permit the starting of motors having the highest values of locked rotor currents, approximately six to ten times normal rated current, (2) capable of providing the shortest permissible time delay necessary for selective tripping on current above locked rotor currents, (3) capable of tripping instantaneously in response to any fault current up to the short time delay rating of the breaker to provide maximum protection for equipment and other breakers when connected in cascade, (4) capable of wide range of pickup variation of the time delay element, (5) capable of operation on alternating current and direct-current breakers, (6) readily removable and interchangeable to facilitate changes in breaker ratings and tripping characteristics, and (7) that is reliable in operation over long periods and under all types of service with a minimum of maintenance.

The novel features that are considered characteristic of the invention are set forth in particular in the appended claims. The invention itself, however, both as to structure and operation, together with additional objects and advantages thereof, will best be understood from the following detailed description of one embodiment thereof when read in conjunction with the accompanying drawings.

In said drawings:

Figure 1 is a side elevational view, partly in section, of a circuit breaker embodying the invention, Fig. 2 is an enlarged vertical sectional view of a modification of the movable core structure of the trip device, Fig. 3 is a sectional view taken on line III—III of Fig. 1 showing the calibrating device, Fig. 4 is a detailed view showing the trip device in its normal position, Fig. 5 is a view similar to Fig. 4 but showing the movable core structure in the position it assumes during a time delay tripping operation, Fig. 6 is a view similar to Fig. 4 but showing the movable core structure in its instantaneous tripping position, Fig. 7 illustrates variations in time-current curves obtained by the use of different timing elements, and Fig. 8 illustrates these time-current curves for these circuit breakers connected in cascade, the different time-current curves being obtained by the use of different timing elements.

Referring to Fig. 1 of the drawings, the reference numeral 11 designates a base of insulating material. A pair of terminals 13 and 15 are suitably secured to the base and are provided respectively with connecting studs 17 and 19.

The contact means and mechanism of the circuit breaker illustrated are similar to the circuit breakers fully disclosed in Patent No. 2,214,471, issued September 10, 1940, to Leon R. Ludwig and Merle E. Horn, and assigned to the assignee of the instant invention. Hence, only a brief description of these parts will be given herein.

The stationary contact means comprises main stationary contacts 25—27 secured respectively to contact blocks 21 and 23, an intermediate contact 29 and a stationary arcing contact 31.

The movable contact means comprises a main bridging contact member 55 having contact members 67 mounted thereon for cooperation with the main stationary contacts 25—27, a movable intermediate contact 69 which cooperates with the intermediate contact 29 and a movable arcing contact 71 for cooperating with the stationary arcing contact 31. The main bridging contact member 55, the movable intermediate contact 69 and the movable arcing contact 71 are all suitably mounted on a contact-carrying arm 49 which is rigidly mounted on a pivoted switch member 51.

The switch member 51 is operatively connected by means of a link 89 to an actuating lever 85 pivotally mounted on a pivot pin 87 supported in a main frame 79. The actuating lever 85 is releasably connected to an operating member 91, also pivoted on the pin 87, by means of a pair of latches 93 and 95 which are pivotally mounted on the actuating lever 85 at 97 and 99 respectively. The latch 93 engages a latch roller 101 carried by the operating member 91, and is held in latching position by the latch 95. The operating member 91 is releasably held in closed position by means of a main holding latch 103 pivoted at 119, which releasably engages the latch roller 101.

The latch 95 is provided with a tailpiece 105 by which it is operated to release the latch 93 and consequent tripping of the circuit breaker by release of the actuating lever 85 from the operating member 91. When released the actuating lever 85 is moved by means of a pair of accelerating springs 109 (only one being shown), in a counterclockwise direction about its pivot 87, causing opening of the movable contact means. During an opening movement of the actuating lever 85, a cam surface 107 thereon engages the rounded nose of the main holding latch 103 and moves this latch to effect release of the operating member 91.

In order to close the circuit breaker after it has been tripped open, the operating member 91 is first moved counterclockwise to the open position to reset the latches and reestablish the connection between the operating member 91 and the actuating lever 85. Thereafter, the operating member is moved clockwise to closed position by means of a handle 111 to effect closing of the contact means.

The circuit breaker is arranged to be tripped open either manually, or to be tripped automatically in response to predetermined overloads in the circuit, by means of a trip means indicated generally at 115.

The trip device comprises a trip lever 117 pivotally mounted intermediate its ends on the frame 79 by means of the pivot pin 119; an electromagnetic trip device indicated generally at 121, which is operable in response to predetermined overload currents to move the trip lever 117 to tripping position to effect automatic opening of the circuit breaker.

One arm 123 of this trip lever 117 is offset and extends inwardly toward the base 11 and has its inner end disposed above the tripping electromagnet 121 to be engaged and operated by a tripping plunger to effect automatic tripping of the breaker. The arm 123 of the trip lever is provided with a projection 125 which, upon tripping operation of the trip arm, engages the curved tailpiece 105 of the latch 95 to move this latch to tripping position. The other arm of the trip lever 117 forms a handle 127 whereby the trip lever may be manually moved to tripped position to effect manual opening of the circuit breaker. The main latch 103 is biased to latching position and the trip lever 117 is biased to normal position by means of a spring 129 tensioned between the arm 123 of the trip lever and an extension of the holding latch.

The electromagnetic trip device 121 comprises generally a fixed magnet yoke 131, a movable core structure 133, a trip rod 135 operable by the movable core structure and an energizing winding 137 having one end electrically connected to the contact block 23 and the other end electrically connected to the terminal 15.

The fixed magnet yoke 131 is generally U-shaped and is provided with mounting feet 139 by means of which the trip device is rigidly but removably mounted on the base 11, being secured thereto by means of bolts 141. The contact block 23 is electrically connected to the upper end of the winding 137 by means of a short conductor 143. The lower terminal stud 19 is formed at right angles and is rigidly secured to the front of the base 11 by means of a bolt 145 and nut 147 which also secures the terminal strip 15 to the stud 19. The winding 137 is insulated from the lower leg of the magnet yoke 131 and from the movable core structure by means of an insulating spool 149.

The movable core structure 133 comprises a sealed casing 151 of non-magnetic material of stainless steel filled with a suitable fluid silicone to the level indicated by the dotted line in Fig. 2 and having a core member or armature 153 secured to the lower end thereof by any suitable means, for instance, by brazing, thus sealing the lower end of the casing. The upper end of the casing 151 extends through an opening in the upper leg of the fixed magnet yoke 131 and has a flange 155 formed thereon which normally rests on the fixed core member. A disc 157 secured to the flange 155, as by welding, forms a closure for the upper end of the casing 151 which, together with the core member 153, hermetically seals the casing.

Suitable fluid polymeric organo-siloxanes for use in the sealed casing are polymeric silicones having the following general formula:

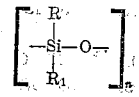

where R and R₁ are monovalent hydrocarbon radicals, R representing alkyl radicals and R₁ representing alkyl and phenyl radicals and $n$ is an integer of a value of at least 4. Specific examples of such polymers are dimethyl silicone, diethyl silicone, phenyl methyl silicone, and phenyl alkyl silicone. Polymeric dimethyl silicone fluids of various degrees of viscosity at a given temperature of use may be employed in the casing. It is preferred to use a fluid silicone of a high viscosity, for example one of a viscosity of 1000 centistokes at 25° C. However, fluids of a viscosity of from about 10 to 10,000 centipoises at 25° C. may be employed.

Some of the advantages of the fluid polymeric silicones are their small change in viscosity with temperature. All the silicone fluids have considerably flatter viscosity-temperature curves than petroleum hydrocarbons or other organic oils or liquids. The silicone fluids may be used at temperatures as low as −50° F. and temperatures of over 300° F. They will not gum or sludge under conditions of use. They are characterized by outstanding stability.

Disposed within the sealed casing 151 is an upper core member or armature 159 having a conical recess or pole-face 161 in the lower end thereof for cooperatnig with the pole face 163 in the form of a truncated cone on the upper end of the core member 153. A bypass timing valve stem or valve housing 165 (Fig. 2) of nonmagnetic stainless steel disposed between the flat upper end of the pole face 163 of the core member 153 and the cover disc 157 extends axially through an opening in the upper core member 159, the diameter of the housing 165 being slightly smaller than the opening in the core member. A spring 167 surrounding the valve housing 165 and compressed between a shoulder on the upper core member 159 and the core members 153 biases the upper core member upwardly against a spacer 169 surrounding the upper end of the valve housing 165 above the upper core member 159.

The bypass valve housing 165 comprises a hollow member closed at its upper end by an integral part of the housing and at its lower end by means of a plug 171, the inner end of which comprises a valve seat 173. The plug 171 is secured in the lower end of the housing 165 by any suitable means and is provided with an axially extending opening 175 which cooperates with a transverse opening 177 in the lower end of the housing 165 to provide a passage which is normally closed by a bypass valve 179. The valve 179 is biased to closed position against the valve seat 173 by means of a coil spring 181 surrounding a valve stem 183 integral with the valve 179, the spring being compressed between the valve 179 and a shoulder 185 formed in the upper end of the valve housing. The valve stem 183 is guided in its opening and closing movements by a suitable guide opening 187 formed in the upper end of the housing. Ports 189 are provided in the side wall of the housing 165 at a point near the upper end thereof and the annual orifice between the housing 165 and the member 159 is larger above the ports 189 than it is below these ports to permit passage of fluid to the casing 151 above the upper core member 159 upon operation of the valve 179 as will be more fully described hereinafter.

The tubular lower end 191 of the core member 153 is hollow and extends downwardly through an opening in the lower leg of the magnet yoke 131 and is surrounded by a tapered bushing 193 of magnetic material which is secured in the opening in the lower leg of the fixed magnet yoke 131. The bushing 193 is counterbored to receive a bearing ring 195 of non-magnetic material for guiding the lower end of the movable core structure 133. The upper end of the movable core structure 133 is guided in its reciprocal movement by the casing 151 bearing directly against a reduced portion 197 of the upper leg of the fixed magnet yoke 131.

Secured to the lower leg of the fixed magnet yoke 131 is a U-shaped frame 199 held in place by a bracket 201 which is secured to the magnet yoke by means of screws (not shown). Disposed within the tubular lower end 191 of the core member 153 is an instantaneous trip armature 203 having bearing rings 205 of non-magnetic material secured thereto adjacent each end thereof. The armature 203 normally rests on an adjusting screw 207 threadedly engaging a bracket 209 supported between the sides of the frame 199. The adjusting screw may be turned in either direction to vary the position of the armature 203 relative to the core member 153 and is locked in its adjusted position by means of a lock nut 211.

Secured to the tubular extension 191 of the core member 153 near the lower end thereof is a pair of spaced rings 213 having extensions 215 on one side thereof. A generally U-shaped member 217 has its legs pivotally mounted in V-shaped notches 219 (only one being shown) in the side members of the frame 199. The free end of the member 217 is biased by means of a spring 221 having one end anchored to the bight of the U-shaped member 217 and the other end attached to a U-shaped adjusting member 223. The member 223 is provided with laterally extending projections 225 which engage the front of a scale plate 227 secured to the frame 199 and is securely clamped in its adjusted position by means of an adjusting screw 229, the shank 231 of which extends through an opening in the member 223, a vertical slot 233 in the scale plate 227 and threadedly engages a rectangular nut 235 which spans the inside of the scale plate to adjustably clamp the member 223 to the scale plate.

The trip device functions within two ranges of overload currents below a predetermined value to trip the breaker after a relatively long time delay in the lower range of overload currents, and with a relatively short time delay in the intermediate range of overload currents, and also instantaneously in response to overload currents above the predetermined value, or in response to short circuits. The ranges of overload currents may be arbitrarily defined as follows: The low range up to 1000% of normal rated current, between 1000% and 2500% of rated current for the intermediate range, and 2500% or more of rated current for the instantaneous tripping range. The limits of the intermediate range of overload currents set forth are to be considered merely by way of example and these may be varied considerably to suit particular requirements. For instance, by the provision of stronger or weaker springs entirely different sets of values may be established. The value of overload current at which the breaker will be instantaneously tripped may be varied by varying the position of the armature 203 or by varying the cross-sectional area or mass of the instantaneous tripping armature. Also, by replacing the bypass valve 179 and the valve housing 165 with a solid rod having the same outside diameter as the housing, the short time delay on overload currents in the intermediate range may be eliminated in which case, only long time delay tripping and instantaneous tripping would be provided, and this time delay may be varied by providing rods of different diameter.

When a persistent overload occurs in the low range of overload currents, the magnetic circuit is energized but, due to the high density flux between the upper portion of the upper core member 159 and the reduced annular portion 197 of the fixed magnet yoke 131, the core member 159 will first drop down slightly until the top of the member 159 is substantially in line with the lower face of the portion 197 and will then be held substantially in this position while the magnetic flux in the air gap 161—163 starts to move the core member 153 and the sealed casing 151 slowly upwardly. In the low range of overload currents, the upward pull on the core member 153 creates a pressure on the fluid in the casing 151 below the upper core member 159, but this pressure is insufficient to overcome the spring 181 and open the bypass valve 179, consequently the fluid is forced upwardly through the space between the valve housing 165 (Fig. 2) and the upper core member 159 thus providing a relatively long time delay before the sealed casing engages and operates the trip rod 135 to effect tripping the breaker. As the core member 153 and the sealed casing 151 move upwardly, the air gap 161—163 is gradually reduced thereby applying a greater force to the sealed casing at the time the casing engages the trip mechanism to effect the actual tripping of the breaker.

In some installations the short time delay tripping effected by the bypass valve 179 may not be required in which event the bypass valve may be omitted and a solid timing stem 165' (Fig. 1) of non-magnetic stainless steel substituted therefor. In this case, the only orifice through which the fluid may flow from the space below the upper core member 159 to the space above the core member is the annular orifice between the rod 165' and the member 159. Substitution of the solid rod 165' for the bypass valve 179 provides inverse time delay on overload current values up to 2500% of rated current. This time delay may be varied by the provision of rods 165' of different diameter, thus varying the size of the annular orifice.

Before the sealed casing can start its tripping movement, the forces in the magnetic circuit must be great enough to overcome the weight of the several parts and the tension of the calibrating spring 221. When this force is attained, the movable core structure, through the projection 215 on the lower ring 213, rotates the U-shaped member 217 clockwise against the tension of the spring 221. As the upward movement of the movable core structure progresses, the movement of the member 217 reduces the moment arm with which the force of the spring 221 is applied to the movable core structure, thereby maintaining the applied restraining force of the spring 221 substantially constant throughout the tripping movement of the movable core structure.

The minimum current at which the trip device will function to trip the breaker may be varied by releasing the adjusting screw 229 and sliding the member 223 up or down to the desired position as indicated by suitable indicia (not shown) on the scale plate 227, and then tightening the screw 229 to lock the member 223 in the selected position. Movement of the member 223 in the slot 233 varies the tension of the spring 221 and also varies the moment arm at which the force of the spring is applied to the movable construction. By moving the member 223 upwardly far enough to carry the line of action of the spring 221 over center above the member 217, the spring 221 will bias the core member 153 and the casing 151 in tripping direction thereby permitting lower minimum pickup settings.

When the trip device is energized in response to an overload current in the intermediate range of overload currents, the magnetic forces create a much greater pressure in the sealed casing 151 below the member 159. This pressure is sufficient to overcome the force of the valve spring 181 and open the valve 179, thus permitting a greater rate of flow of the fluid past the member 159. By permitting an increased rate of flow of the fluid, the time delay is much shorter in response to overload currents within the intermediate range than it is on overload currents in the low range of values but appreciably longer than instantaneous tripping.

When the trip device is energized in response to an overload current above 2500% of rated current, or a short circuit, the instantaneous trip armature 203 is actuated. This armature, when actuated, moves quickly upward striking a suitable impact absorbing material 237, such for example as felt or leather, and thereafter moving the entire movable core structure 133 bodily upward to effect instantaneous tripping of the breaker.

After the trip device has functioned, either on a time delay tripping operation or on instantaneous tripping operation, the parts are returned to their normal positions by gravity aided by the calibrating spring 221. The spring 167 restores the upper core element 159 upwardly to its normal position adjacent the stop 169.

Various combinations of elements may be assembled in the movable core structure to produce various tripping characteristics. For instance, referring to Fig. 7, the instantaneous trip armature 203 may be omitted and the solid rod 165' assembled in the sealed casing. This would result in time delay tripping with an inverse time delay on all overload currents, as illustrated by curve A (Fig. 7). Still omitting the instantaneous trip armature and substituting the bypass device 179 would result in relatively long time delay tripping on overload currents up to a predetermined value and tripping with a relatively short time delay on overload currents above the predetermined value, as shown by curve C (Fig. 7). Curve B (Fig. 6) shows the time-current curve obtained by using a solid timing stem 165' of smaller diameter than is used to produce curve A, thus providing a short time delay for all values of fault currents. Again, by using the solid rod 165' in combination with the instantaneous trip armature 203, long time delay tripping would result on overloads up to a predetermined value and instantaneous tripping would be effected on overload currents above the predetermined value shown at A—A', (Fig. 7). Also, as previously described, the instantaneous trip armature and the bypass valve device assembled in the trip device results in the combination of relatively long time delay tripping on overloads in the low range relatively short time delay tripping on overloads in the intermediate range, and instantaneous tripping on overload currents above a predetermined value, or on short circuits.

The time characteristics for both long time delay and short time delay tripping may be changed by varying the size of the annular orifice between the rod 165' or the valve housing 165 and the member 159, and by varying the size of the passage 175 (Fig. 2). By varying the strength of the valve spring 181, the value of overload current required to start the tripping operation may be varied. Also the instantaneous trip characteristics may be varied by varying the mass and/or position of the instantaneous trip armature 203. Thus the tripping characteristics may be varied over a wide range for each range of overload currents.

The variable characteristic obtained by interchanging the several elements of the trip device, as set forth above, well adapts the trip device for use in the selective tripping of circuit breakers. Fig. 8 illustrates the true current curves for a typical selectivity application. In this illustrative application a 100 ampere load breaker is provided with both long time delay and instantaneous tripping to permit motor starting as shown by curve C (Fig. 8). A 400 ampere feeder breaker equipped with long time delay and short time delay tripping curve B (Fig. 8) is provided to obtain selectivity with the motor starting load breaker. A 1600 ampere transformer breaker is provided to supply power to the system. This breaker is equipped with short time delay (curve A, Fig. 8) only and is set to pick-up at 3000 amperes. This provides for selectivity with the 400 ampere feeder breaker and all other feeder breakers. If the transformer is capable of delivering currents of greater magnitude than the interrupting capacity of the load and feeder breakers, both selective tripping and cascade tripping may be combined by providing the feeder and transformer breakers with instantaneous trip armature adjusted to trip on overloads equal to the interrupting capacity of the load and feeder breakers as indicated by the dotted portion D of the curves A and B (Fig. 8). In such an application selective tripping is obtained on overloads below the interrupting capacity of the load and feeder breakers and all breakers will trip instantaneously on overloads equal to the interrupting capacity of the load and feeder breaker.

Having described the invention in accordance with the patent statutes, it is to be understood that various changes and modifications may be made in the structural details and combination of elements disclosed without departing from some of the essential features of the invention.

We claim as our invention:

1. In a circuit breaker for controlling an electric circuit, the combination of an electromagnetic trip device comprising an energizing winding, a trip rod, a sealed casing movable to engage and actuate said trip rod, a first armature having a portion disposed in said casing and a tubular portion outside of said casing, said armature being operable upon energization of said winding in response to overload currents to move said casing, means comprising a magnetizable core member having an axially disposed opening therethrough disposed in said casing and responsive to energization of said winding to oppose movement of said casing, and a member extending through said opening and movable with said casing for controlling the rate of tripping movement of said casing, and a second armature in said tubular portion operable to instantaneously move said casing to cause said casing to engage and instantaneously actuate said trip rod.

2. In a circuit breaker for controlling an electric circuit, the combination of an electromagnetic trip device comprising an energizing winding, a sealed casing containing a body of fluid and movable to effect a tripping operation, a first armature having a portion disposed in said casing and operable upon energization of said winding in response to certain circuit conditions to move said casing in tripping direction, means including an element having an axial opening therethrough disposed in said casing and held against movement in one direction by energization of said winding to provide a time delay in the tripping movement of said casing, a by-pass valve device in said opening movable with said casing for controlling the rate of flow of fluid through said opening to thereby control the rate of tripping movement of said casing, and a second armature disposed in axial alignment with said casing and operable in response to certain other circuit conditions to effect instantaneous tripping movement of said casing.

3. In a circuit breaker for controlling an electric circuit, the combination of an electromagnetic trip device comprising an energizing winding, a trip member, a sealed casing containing a body of fluid and movable to engage and actuate said trip member, a first armature disposed in said casing and operable upon energization of said winding in response to overload currents to move said casing, a second armature having a fluid passage disposed axially therethrough disposed in said casing and restrained against movement by energization of said winding, means biasing said second armature to one end of said casing, a valve housing disposed in said passage to be moved with said casing for restricting the flow of fluid past said second armature to control the rate of tripping movement of said casing in response to overload currents below a predetermined value, a by-pass valve in said valve housing for controlling the flow of fluid to thereby control the rate of tripping movement of said casing in response to overload currents above said predetermined value, and a third armature disposed in axial alignment with said first armature and operable to engage and move said first armature and said casing to effect instantaneous operation of said trip member.

4. In a circuit breaker, the combination of an electromagnetic trip device comprising an energizing winding, a sealed casing containing a body of fluid and movable to effect a tripping operation, a first armature disposed in said casing and operable upon energization of said winding in response to overload currents below a predetermined value to move said casing, a tubular extension on said armature extending outside of said casing, a second armature having a fluid passage therethrough disposed in said casing to be restrained against movement by energization of said winding, a member disposed in said fluid passage and movable with said casing to control the flow of fluid through said passage to thereby control the rate of tripping movement of said casing, and a third armature disposed in said tubular extension and operable upon energization of said winding in response to overload currents above said predetermined value to instantaneously move said casing.

5. In a circuit breaker, the combination of a trip device comprising an electromagnet, a sealed casing movable to effect a tripping operation, an armature disposed in said casing operable upon energization of said electromagnet in response to overload currents below a predetermined value to move said casing, a tubular extension on said armature extending outside of said casing, a magnetizable core member having a passage therethrough disposed in said casing to be held against movement in response to overload currents below said predetermined value, a member disposed in said passage to retard tripping movement of said casing, and an armature disposed in said tubular extension and operable in response to overload currents above said predetermined value to instantaneously move said casing to thereby effect an instantaneous tripping operation.

6. In a circuit breaker, the combination of a trip device comprising electromagnetic means forming a magnetic circuit, a sealed casing containing a body of fluid and disposed for tripping movement within said circuit, a movable armature disposed in said casing to move within said magnetic circuit for moving said casing, a magnetizable member disposed within said casing to be held against movement by the magnetic flux in said magnetic circuit, said magnetizable member having an opening therethrough, a separate valve housing disposed in said opening rigidly supported between said armature and one end of said casing for movement with said casing relative to said magnetizable member, said valve housing cooperating with said magnetizable member to define a passage permitting a predetermined flow of fluid past said magnetizable member under certain conditions, valve means in said housing operable under certain other conditions to increase the rate of flow of fluid past said magnetizable member, and a second armature disposed in axial alignment with said casing operable under certain other conditions to instantaneously move said casing.

7. In a circuit breaker, the combination of a trip device comprising electromagnetic means forming a magnetic circuit, a sealed casing of non-magnetizable material containing a body of fluid and disposed for tripping movement within said magnetic circuit, a first armature disposed in said casing to move within said magnetic circuit for moving said casing, a magnetizable member having an opening therethrough and disposed within said casing to be held against movement by the magnetic flux in said magnetic circuit, an element disposed in said opening rigidly supported between said armature and one end of said casing for movement with said casing relative to said magnetizable member, said element cooperating with said magnetizable member to define an annular fluid passage permitting displacement of fluid past said magnetizable member under certain conditions, the rate of tripping movement of said casing being determined by the rate of displacement of fluid past said magnetizable member, and a second armature disposed below said casing operable under certain other conditions to engage and instantaneously move said first armature and said casing.

8. In a circuit breaker, the combination of an electromagnetic trip device comprising an energizing winding, a trip member, a sealed casing containing a body of fluid and movable to engage and operate said trip member, an armature disposed in said casing and operable upon energization of said winding in response to overload currents below a predetermined value to move said casing, a magnetizable member having an opening therethrough disposed in said casing to be held against movement by energization of said winding, a rod disposed in said opening cooperating with said magnetizable member to define an annular passage to control the flow of fluid past said magnetizable member to effect a time delay in the tripping movement of said casing, a second armature mounted in axial alignment with said casing and operable upon energization of said winding in response to overload currents above said predetermined value to engage and move said casing to cause said casing to instantaneously operate said trip member, resilient means opposing tripping movement of said casing, and means operable to vary the tension of said resilient means to vary the minimum overload current required to move said casing.

9. In a circuit breaker, the combination of an electromagnetic trip device comprising a fixed magnetic member and an energizing winding, a trip member, a sealed casing containing a body of fluid and movable within said winding to engage and actuate said trip member, a first armature disposed in said casing and having a tubular portion extending out of said casing, said armature being operable in response to overload currents below a predetermined value to move said casing, a magnetizable element having an opening therethrough and disposed in said casing to be held substantially stationary during tripping movement of said casing by energization of said winding in response to overload currents below said predetermined value, means biasing said magnetizable element to one end of said casing, a valve housing disposed in said opening and cooperating with said magnetizable element to define a restricted passage for controlling displacement of fluid in response to certain overload current values below said predetermined value to effect a relatively long time delay in the tripping movement of said casing, valve means in said valve housing operable in response to certain other overload current values below said predetermined value to increase the fluid displacement to effect a relatively short time delay in the tripping movement of said casing, and a second armature disposed in said tubular extension operable in response to overload currents above said predetermined value to engage and move said casing to cause said casing to instantaneously actuate said trip member.

10. In a circuit breaker, the combination of an electromagnetic trip device comprising a fixed magnetic member and an energizing winding, a sealed casing containing a body of fluid and movable within said winding to cause a tripping operation, a first armature disposed in said casing and having a tubular portion extending out of said casing, said armature being operable in response to overload currents below a predetermined value to move said casing, a magnetizable element having an opening therethrough and disposed in said casing to be held substantially stationary by energization of said winding in response to overload currents below said predetermined value, means normally biasing said magnetizable element to one end of said casing, a valve housing disposed in said opening and cooperating with said magnetizable element to define a restricted passage for controlling displacement of fluid in response to certain overload current values below said predetermined value to retard tripping movement of said casing for a relatively long time interval, valve means in said housing operable in response to certain other overload current values below said predetermined value to increase the fluid displacement to thereby retard tripping movement of said casing for a relatively short time interval, and a second armature disposed in said tubular portion and operable in response to overload currents above said predetermined value to instantaneously move said casing.

11. In a circuit breaker, an electromagnetic trip device comprising an energizing winding, a movable core structure operable upon energization of said winding comprising a sealed casing disposed for tripping movement within said winding and containing a body of fluid polymeric dimethyl silicone, a first armature disposed within said casing for moving said casing, a magnetizable member provided with an axially disposed opening therethrough disposed in said casing and responsive to energization of said winding for retarding tripping movement of said casing, said casing and said magnetizable member being disposed for relative movement in response to energization of said winding by overload currents below a predetermined value to effect a time delay in the tripping movement of said casing, valve means disposed in said opening in said magnetizable member and movable with said casing for controlling the rate of tripping movement of said casing, and a second armature mounted externally of said casing but in axial alignment therewith and operable upon energization of said winding in response to overload currents above said predetermined value to engage and bodily move said casing to effect an instantaneous tripping movement of said casing.

JEROME SANDIN.
HERBERT L. RAWLINS.

REFERENCES CITED

The following references are of record in the file of this patent:

UNITED STATES PATENTS

| Number | Name | Date |
|---|---|---|
| 1,123,288 | Hellmund | Jan. 5, 1915 |
| 1,154,359 | Basch | Sept. 21, 1915 |
| 1,293,697 | Canfield | Feb. 11, 1919 |
| 2,357,959 | Kouyoumjian | Sept. 12, 1944 |
| 2,398,187 | McGregor | Apr. 9, 1946 |
| 2,411,800 | Nardone | Nov. 26, 1946 |
| 2,439,165 | Graves | Apr. 6, 1948 |
| 2,451,962 | Lindstrom | Oct. 19, 1948 |

OTHER REFERENCES

Magnets, by Underhill, page 67, McGraw-Hill Book Co., Inc., 370 Seventh Ave., New York, N. Y., 1924.